United States Patent [19]

Narayanaswami

[11] Patent Number: 5,555,355
[45] Date of Patent: Sep. 10, 1996

[54] SYSTEM AND METHOD FOR CLAMPING VARIABLE VALUES WITHOUT USING BRANCH INSTRUCTIONS

[75] Inventor: Chandrasekhar Narayanaswami, Austin, Tex.

[73] Assignee: International Business Machines Corporation, Armonk, N.Y.

[21] Appl. No.: 121,140

[22] Filed: Sep. 14, 1993

[51] Int. Cl.$^6$ ............................................. G06T 11/00
[52] U.S. Cl. ............................................ 395/133; 395/126
[58] Field of Search ................................. 395/133–139, 395/131, 126, 132; 358/29, 44; 364/DIG. 1, DIG. 2

[56] References Cited

U.S. PATENT DOCUMENTS

| | | | |
|---|---|---|---|
| 4,053,946 | 10/1977 | Opittek et al. | 395/100 |
| 4,608,595 | 8/1986 | Nakayama et al. | 358/29 |
| 5,036,316 | 7/1991 | Kemplin | 395/118 |
| 5,072,418 | 12/1991 | Boutaud et al. | 364/715.06 |
| 5,251,019 | 10/1993 | Moorman et al. | 358/44 |

*Primary Examiner*—Almis R. Jankus
*Attorney, Agent, or Firm*—Mark S. Walker

[57] ABSTRACT

A system for efficiently clamping lighted color vertex data without using processor branch instructions. The system implements a processor instruction for finding the absolute value of a variable without issuing a branch instruction. The branchless absolute value instruction can then be used to determine a clamped color vertex value without disrupting the instruction pipeline or instruction cache. The invention achieves enhanced performance by effectively employing the instruction pipeline.

10 Claims, 2 Drawing Sheets

SYSTEM AND METHOD FOR CLAMPING VARIABLE VALUES WITHOUT USING BRANCH INSTRUCTIONS

BACKGROUND OF THE INVENTION

1. Field of the Invention

The present invention relates to computer systems for displaying graphics information and more particularly to processes for controlling data: variable values without using branching instructions.

2. Background and Related Art

Graphic display systems generate images on a display device in response to Graphic drawing commands. Graphic drawing commands are entered by a system operator using software for Computer Aided Design (CAD) or other drawing or "painting" software. The Graphic display is presented preferably as a color image or, less desirably, as a monochrome image having multiple shading levels.

Color graphics systems store a numerical value representing color in each picture element (pixel) position. This numerical value is extracted and sent to a digital to analog converter (DAC) that generates the color or shaded signal to the display device. The DAC uses a lookup table to transform the pixel value to the appropriate red, green, blue (RGB) and alpha signals. The lookup table accepts a variable value as input and typically outputs a color value in the range of 0 to 255 for each of the red, green and blue colors. The variable value is typically stored as a number between 0 and 1, though other ranges could be used.

Problems can occur when the value of the variable is outside of the expected range (i.e. greater than 1 or less than 0.) Prior art systems have implemented variable test code to test each variable value to make sure it is within the expected ranges. Each pixel receives its assigned value by operation on the vertices of the polygon in which the pixel appears. It is therefore sufficient to test the RGB and alpha values of each vertex to ensure they are within the necessary range. Limiting the test to vertices, however, still results in a large number of calculations for any complex figure with a large number of polygons and hence vertices.

Clamping a value x between a and c is expressed by the following equation:

$$y = \begin{cases} c & \text{if } x > c \\ x & \text{if } a \leq x \leq c \\ a & \text{if } x < a \end{cases} \quad (1)$$

Prior art systems implement clamping by testing each value using the logic shown in equation (2).

float x, y, a, c;

$$y=x; \quad (2)$$

if (y<a) y=a;
else if (y>c) y=c;

This equation uses branching instructions within the computer system (implementing if-then constructs.) Branching instructions are inefficient in most systems because they interrupt the instruction pipeline. System performance is significantly impacted by this conditional structure because the clamping must be done in totem-pole fashion for each color component red, green, blue and alpha. The alpha value controls transparency or anti-aliasing in the typical system. Totem-pole tests are performed one after the other thereby creating many branches and greatly degrading the pipeline system.

It is desirable to find a method for implementing clamping of variable values without impacting the efficiencies of the processor pipeline. Such a technique would result in significant processing speed improvement due to the large number of values that must be clamped in a graphics system.

SUMMARY OF THE INVENTION

The present invention is directed to providing a system and method for clamping variable values without requiring use of a branch instruction. The present invention employs an labs instruction to move the branch evaluation from the instruction sequence to the underlying hardware ALU on the processor. Movement of the branch evaluation results in improved processing speed since no instruction branching is required.

In particular, the present invention is directed to an apparatus for clamping graphic color values without instruction branching. The apparatus comprises: processor means for processing a plurality of arithmetic/logic instructions, the instructions including branch instruction causing execution of an instruction out of sequence; absolute value means for determining the absolute value of a number without using one of the branch instructions; and clamping means for providing a clamped color graphic value without invoking one of the branch instructions.

It is therefore an object to clamp individual variable values between two limits without using computer system branch instructions.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
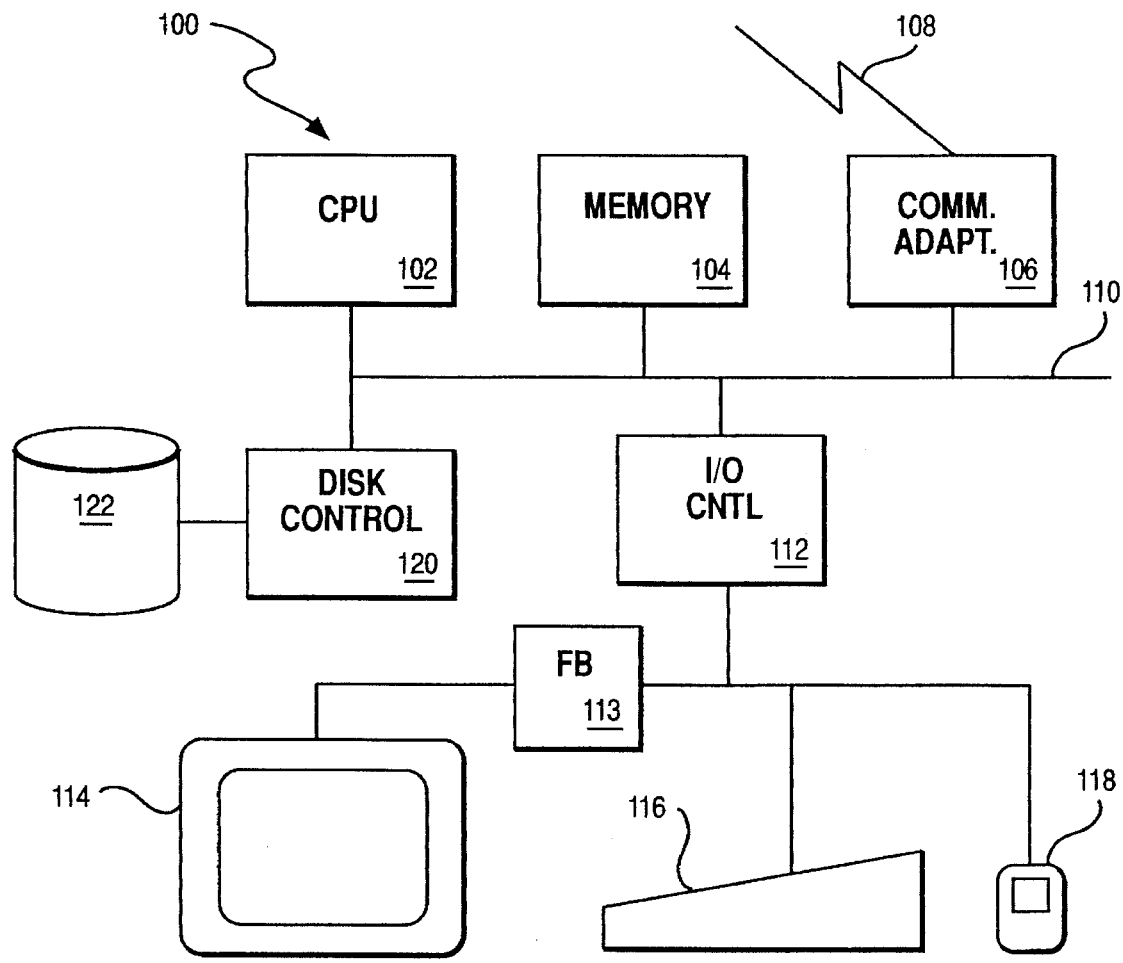
FIG. 1 is a block diagram of a computer system on which the present invention may be practiced.

The present invention is implemented in a computer system such as that shown in FIG. 1. The computer system is preferably an IBM RISC System/6000 computer from the IBM Corp. (IBM and RISC System/6000 are trademarks of the IBM Corp.) though any similar workstation, personal computer or mainframe computer could be employed.

The computer system 100 has a processing unit 102, random access memory 104 and permanent storage 122. In addition, an optional communications adapter 106 enables communication with other computer systems. Input/Output controller 112 controls interaction with the video display 114, the keyboard 116 and pointing device 118. A frame buffer or graphics memory 113 is provided in the preferred embodiment to store the pixel data for display on the display device 114. Disk controller 120 controls interaction between the processing unit and the permanent storage 122. The options represented here are typical components used in the preferred embodiment. Other components with similar function could replace those shown, for example, a removable diskette or an optical drive could be used in place of a magnetic drive for permanent storage 122 and the processor 102 could be comprised of a number of processing engines in a multiprocessor or parallel processing architecture.

Figure 2:
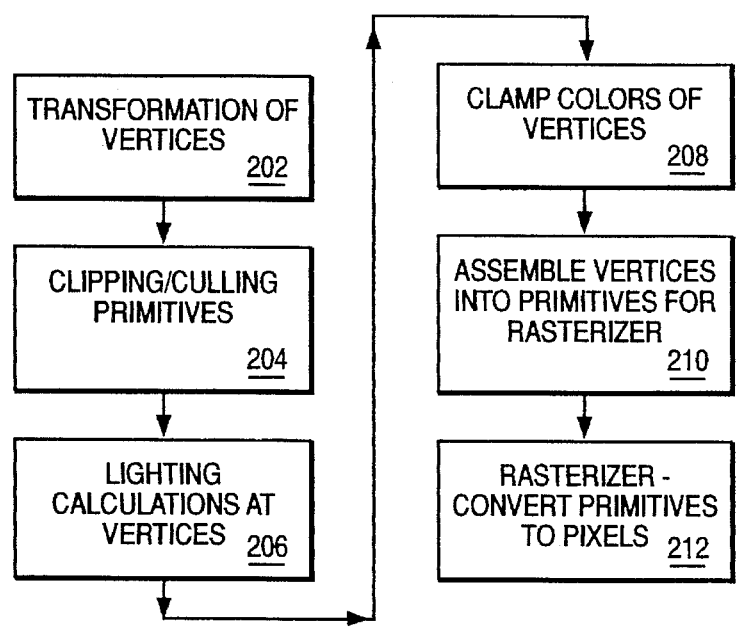
FIG. 2 is a block diagram illustrating the functions of a graphics processing system including the present invention.

Processing of graphics drawing orders occurs as shown in FIG. 2. Graphic order processing can be accomplished by a hardware graphic adapter(not shown) connected between the system bus and display 114. In the preferred embodiment, however graphic order processing is performed by processing unit 102, using random access memory 104, permanent storage 122 and input/output controller 112.

Drawing a polygon with, for example, five vertices, proceeds as follows. Each vertex is transformed from world space coordinates to display coordinates (step 202.) The polygon is clipped/culled to eliminate any portions that are not visible on the display (step 204.) Lighting calculations are performed at each vertex to compute the color at the vertex based on the lighting model and orientation after transformation (step 206.) The colors expressed as (R,G,B, $\alpha$) for each vertex are clamped between permissible values a and c (step 208.) In the preferred embodiment, the colors are clamped between 0 and 1 (i.e. a=0, c=1). The resulting vertices are assembled into primitives recognizable by the rasterizer (step 210) and the rasterizer converts the primitives to pixels (step 212) written to the frame buffer.

Figure 3:
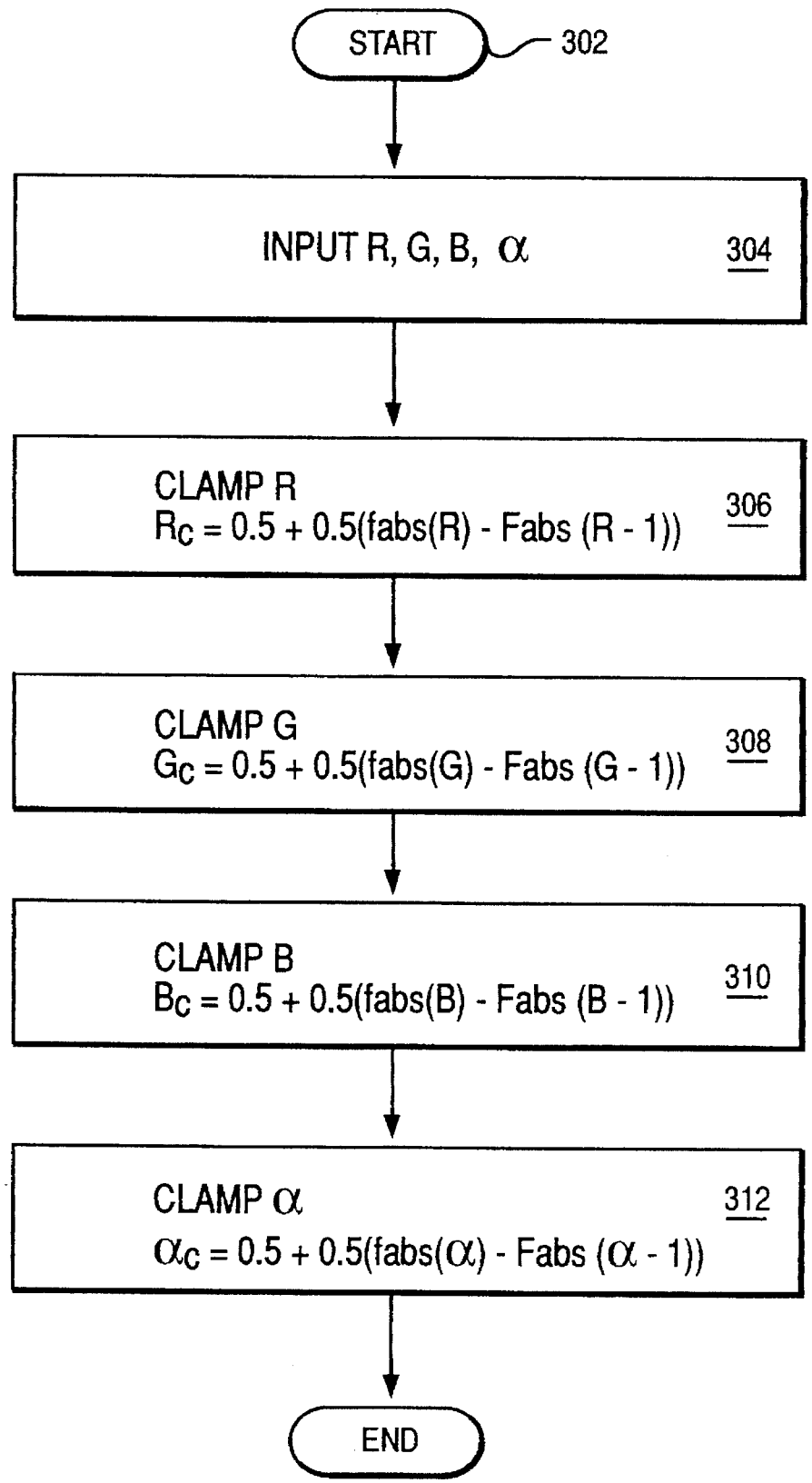
FIG. 3 is a flowchart illustrating the steps of the method according to the present invention.

The inventive clamping process is shown in FIG. 3. The invention makes use of a function entitled fabs. The function fabs(x) returns the absolute value of x. In the preferred embodiment of the present invention fabs() is implemented as a processor instruction in processing unit 102. Implementation as a processor instruction eliminates possible instruction branches thereby maintaining the instruction pipeline and improving efficiency.

The process starts at step 302 and immediately proceeds to step 304 where the red., green, blue and alpha values for vertex i is input as $r_i$, $g_i$, $b_i$, $\alpha_i$. These values are each claimed between 0 and 1 by steps 306, 308, 310, and 312 using the fabs() function. The clamped values for vertex i are then passed to the next processing step and the next vertex (i+1) processed.

This process may be applied to clamp values between any arbitrary numbers a and c by adding a step before step 304 to set the values for a and c and to calculate the variable m=0.5 c. The clamping equation then becomes:

$$k=0.25(x+a+\text{fabs}(x-a)) \qquad (3)$$

$$y=k+m-\text{fabs}(k-m)$$

where x is the initial value of r,g,b,$\alpha$ and y is the respective clamped value.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A graphics system for drawing lighted color polygons, said system operating on a computer system having a processor, memory and storage, the graphics system comprising:

means for transforming said polygons from a first coordinate system to a second coordinate system;

means for clipping said polygon to a visible display area;

means for lighting said verticles according to a lighting model to provide lighted color vertex data;

first instruction means for determining an absolute value of one or more components of one said verticles by said processor without execution of a branching instruction;

second instruction means for calculating a clamped color value of one of said verticles to be displayed based on said absolute value determined by said first instruction means;

means for assembling said clamped color vertex data into a primitive for rasterization.

2. The system of claim 1, wherein said means for clamping includes absolute value determination means for determinating the absolute value of said lighted color vertex data.

3. A computer program product having a computer readable medium having computer program logic recorded thereon for drawing lighted polygons, said computer program product comprising:

means for transforming said polygons from a first coordinate system to a second coordinate system;

means for clipping said polygon to a visible display area;

means for lighting said vertices according to a lighting model to provide lighted color vertex data;

first instruction means for determining an absolute value of one or more components of one of said vertices by said processor without execution of a branching instruction;

second instructions for calculating a clamped color value of one of said vertices to be displayed based on said absolute value determined by said first instruction means;

means for assembling said clamped color vertex data into a primitive for rasterization.

4. The computer program product of claim 3, wherein said means for clamping includes absolute value determination means for determining the absolute value of said lighted color vertex data.

5. A method of limiting a parameter employed in a computing system having a processor and a storage to values of said parameter between a first and a second limit, comprising the steps of:

receiving said parameter in said storage;

first determining an absolute value of one or more components of said parameter by said process without execution of a branching instruction;

second calculating a clamped color value of said parameter based on said absolute value determines said determining an absolute value step.

6. The method of claim 5, wherein said instructions include an processor implemented instruction for finding the absolute value of said variable value.

7. The method of claim 6 wherein said absolute value instruction is identified as fabs, and wherein said step of determining evaluates the following expression:

$$y=0.5+0.5[\text{fabs}(x)-\text{fabs}(x-1)]$$

where x is the variable value, and y is the clamped variable value.

8. The method of claim 5, wherein said first limit is set to 0 and said second limit is set to 1.

9. The method of claim 8, wherein said instructions include an processor implemented instruction for finding the absolute value of a variable.

10. Apparatus for clamping color values of vertices in a graphics display system, comprising:

one or more processors for processing a plurality of instructions of an instruction set including sequentially executed instructions and branching instructions;

a first instruction means for determining an absolute value of one or more components of one of said vertices by said processor without execution of a branching instruction;

a second instruction means for calculating a clamped color value of a vertex to be displayed based on said absolute value determined by said first instruction means; and a display device for displaying said clamped vertices.

* * * * *